(12) United States Patent
Noh et al.

(10) Patent No.: US 8,597,151 B1
(45) Date of Patent: Dec. 3, 2013

(54) PLANETARY GEAR TRAIN OF AUTOMATIC TRANSMISSION FOR VEHICLES

(71) Applicants: Hyundai Motor Company, Seoul (KR); Kia Motors Corporation, Seoul (KR)

(72) Inventors: Myonghoon Noh, Seongnam-si (KR); Kangsoo Seo, Suwon-si (KR); Jae Chang Kook, Hwaseong-si (KR); Hyu Tae Shim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/728,640

(22) Filed: Dec. 27, 2012

(30) Foreign Application Priority Data

Oct. 19, 2012 (KR) .................. 10-2012-0116830

(51) Int. Cl.
*F16H 3/62* (2006.01)
(52) U.S. Cl.
USPC ..................... 475/275; 475/302; 475/311
(58) Field of Classification Search
USPC .................. 475/219, 275, 302, 311
See application file for complete search history.

(56) References Cited

U.S. PATENT DOCUMENTS

| 7,824,303 | B2 | 11/2010 | Wittkopp et al. |
| 8,083,633 | B2 | 12/2011 | Wittkopp et al. |
| 2009/0005208 | A1* | 1/2009 | Borgerson ............ 475/219 |
| 2010/0248891 | A1* | 9/2010 | Wittkopp et al. ......... 477/3 |
| 2011/0111912 | A1* | 5/2011 | Wittkopp et al. ........ 475/219 |

FOREIGN PATENT DOCUMENTS

| JP | 2009-191885 A | 8/2009 |
| JP | 2010-7709 A | 1/2010 |

* cited by examiner

*Primary Examiner* — Edwin A Young
(74) *Attorney, Agent, or Firm* — Morgan, Lewis & Bockius LLP (57) ABSTRACT

A planetary gear train of an automatic transmission includes: a first shaft receiving engine torque; a second shaft parallel with the first shaft and selectively inversely receiving rotation of the first shaft; a first planetary gear set disposed on the first shaft and including a first, second and a third rotation paths; a compound planetary gear set formed by combining a second planetary gear set and a third planetary gear set, and including a fourth, fifth, sixth and seventh rotation paths; three transfer gears interposed between the rotation shafts, and configured to transfer an inverse rotation speed to the second shaft and the rotation paths of the compound planetary gear set; and five frictional elements interconnecting the rotation paths or selectively connecting the rotation paths to a transmission housing.

4 Claims, 11 Drawing Sheets

|     | B1 | C1 | C2 | C3 | C4 | Gear ratio |
|-----|----|----|----|----|----|------------|
| 1ST | ● | ● |   |   | ● | 4.160 |
| 2ND | ● |   | ● |   | ● | 2.857 |
| 3RD |   | ● | ● |   | ● | 1.974 |
| 4TH |   |   | ● | ● | ● | 1.589 |
| 5TH |   | ● |   | ● | ● | 1.294 |
| 6TH |   | ● | ● | ● |   | 1.022 |
| 7TH | ● | ● |   | ● |   | 0.844 |
| 8TH | ● |   | ● | ● |   | 0.702 |
| Rev | ● |   |   | ● | ● | −1.813 |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2012-0116830 filed on Oct. 19, 2012, the entire contents of which is incorporated herein for all purposes by this reference.

BACKGROUND OF THE INVENTION

1. Field of the Invention

The present invention relates to an automatic transmission for a vehicle. More particularly, the present invention relates to a planetary gear train of an automatic transmission for a vehicle that can improve mountability by reducing a length thereof and reduce fuel consumption by improving power delivery performance.

2. Description of Related Art

Typically, a planetary gear train is realized by combining a plurality of planetary gear sets and friction members. It is well known that when a planetary gear train realizes a greater number of shift speeds, speed ratios of the planetary gear train can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotation elements (i.e., sun gear, planet carrier, and ring gear). In addition, the planetary gear train has different features such a durability, power delivery efficiency, and size depend on the layout thereof. Therefore, designs for a combining structure of a gear train are also under continuous investigation.

In addition, the planetary gear train realizes a plurality of shift-speeds. However, another friction member must be operated after one friction member is released so as to shift to a neighboring shift-speed from a view of shift control. In addition, a step ratio between the neighboring shift-speeds should be controlled to be suitable according to the planetary gear train.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving mountability by shortening a length thereof and reducing fuel consumption by improving power delivery performance as a consequence of achieving eight forward speeds and one reverse speed having excellent operating condition of frictional elements and step ratios by combining three planetary gear sets separately disposed on a first shaft and a second shaft, three externally-meshing gears, and five frictional elements.

A planetary gear train of an automatic transmission for a vehicle according to one or more exemplary embodiments of the present invention may include a first shaft receiving torque of an engine, a second shaft disposed in parallel with the first shaft and selectively receiving a rotation speed of the first shaft as an inverse rotation speed, a first planetary gear set disposed on the first shaft and including a first rotation path selectively operated as a fixed element or an output element, a second rotation path directly connected to the first shaft and operated as an input element, and a third rotation path selectively operated as an output element, a compound planetary gear set formed by combining a second planetary gear set and a third planetary gear set, and including a fourth rotation path selectively connected to the third rotation shaft, a fifth rotation path selectively connected to the first rotation shaft, a sixth rotation path connected to an output gear so as to be continuously operated as an output element, and a seventh rotation path directly connected to the second shaft, three transfer gears interposed between the rotation shafts, and configured to transfer an inverse rotation speed to the second shaft and the rotation paths of the compound planetary gear set, and five frictional elements interconnecting the rotation paths or selectively connecting the rotation paths to a transmission housing.

The first planetary gear set may be a single pinion planetary gear set having a first sun gear, a first planet carrier, and a first ring gear, the second planetary gear set may be a single pinion planetary gear set having a second sun gear, a second planet carrier, and a second ring gear, and the third planetary gear set may be a single pinion planetary gear set having a third sun gear, a third planet carrier, and a third ring gear.

The first rotation path may include the first sun gear, the second rotation path may include the first planet carrier, the third rotation path may include the first ring gear, the fourth rotation path may include the second sun gear, the fifth rotation path may include the second planet carrier and the third ring gear, the sixth rotation path may include the second ring gear and the third planet carrier, and the seventh rotation path may include the third sun gear.

The three transfer gears may include a first transfer gear including a first transfer drive gear selectively connected to the first shaft and a first transfer driven gear connected to the second shaft, a second transfer gear including a second transfer drive gear selectively connected to the third rotation path and a second transfer driven gear connected to the fourth rotation shaft, and a third transfer gear including a third transfer drive gear selectively connected to the first rotation path and a third transfer driven gear connected to the fifth rotation shaft.

The five frictional elements may include a first clutch mounted between the first shaft and the first transfer drive gear, a second clutch mounted between the third rotation path and the first transfer drive gear, a third clutch mounted between the third rotation path and the second transfer drive gear, a fourth clutch mounted between the first rotation path and the third transfer drive gear, and a first brake mounted between the first rotation path and the transmission housing.

A first forward speed may be achieved by operating the first brake and the first and fourth clutches, a second forward speed may be achieved by operating the first brake and the second and fourth clutches, a third forward speed may be achieved by operating the first, second, and fourth clutches, a fourth forward speed may be achieved by operating the second, third, and fourth clutches, a fifth forward speed may be achieved by operating the first, third, and fourth clutches, a sixth forward speed may be achieved by operating the first, second, and third clutches, a seventh forward speed may be achieved by operating the first brake and the first and third clutches, an eighth forward speed may be achieved by operating the first brake and the second and third clutches, and a reverse speed may be achieved by operating the first brake and the third and fourth clutches.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

Figure 1:
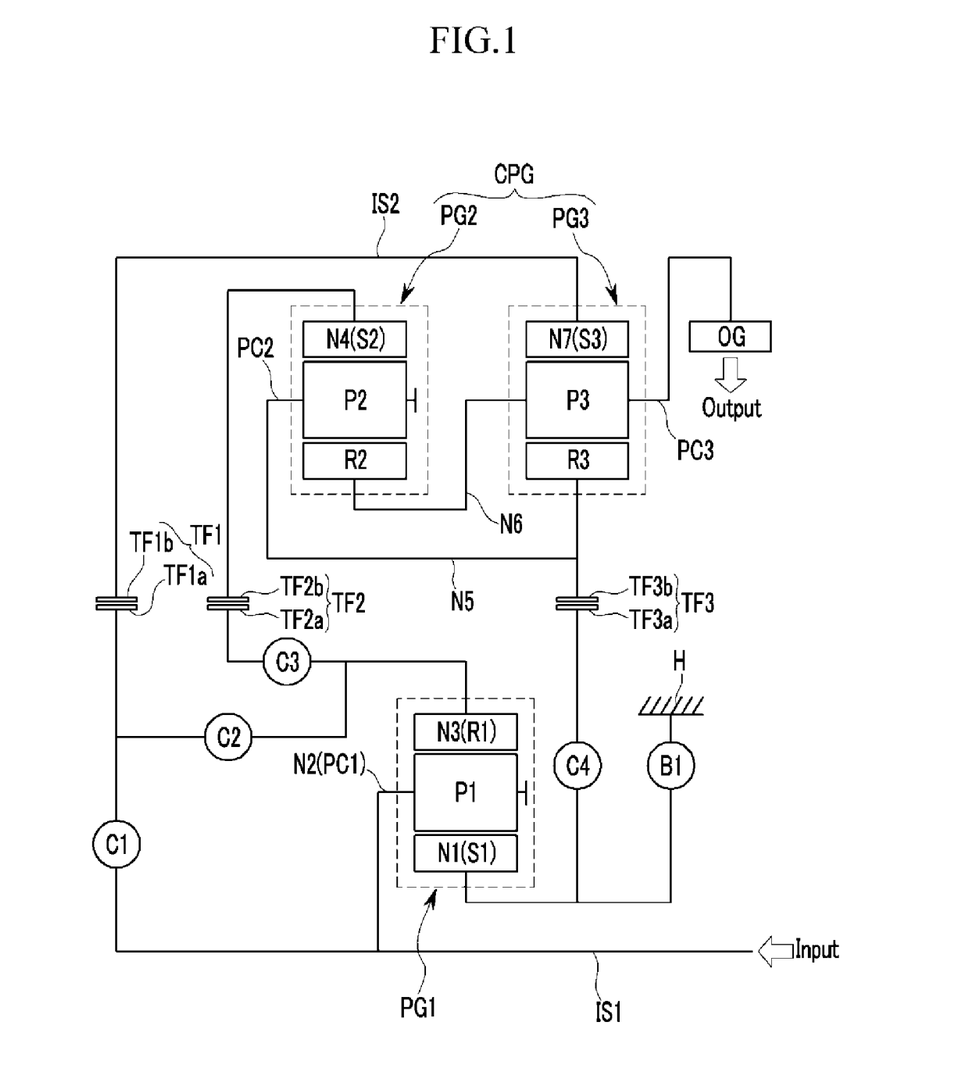
FIG. 1 is a schematic diagram of a planetary gear train according to an exemplary embodiment of the present invention.

FIG. 1 is a schematic diagram of a planetary gear train according to an exemplary embodiment of the present invention.

Referring to FIG. 1, a planetary gear train according to an exemplary embodiment of the present invention includes first, second, and third planetary gear sets PG1, PG2, and PG3, five frictional elements B1, C1, C2, C3, and C4, and three transfer gears TF1, TF2, and TF3.

The first planetary gear set PG1 is disposed on a first shaft IS1, and the second and third planetary gear sets PG2 and PG3 are disposed on a second shaft IS2 disposed apart from and in parallel with the first shaft IS1.

The first shaft IS1 is an input member and supports the first planetary gear set PG1, and torque transmitted from an engine is transmitted to the first planetary gear set PG1.

The second shaft IS2 supports the second and third planetary gear sets PG2 and PG3 and transmits torque selectively transmitted from the first shaft IS1 and the first and second planetary gear sets PG1 and PG2 to the third planetary gear set PG3.

Therefore, torque input from the first shaft IS1 is converted into eight forward speeds and one reverse speed by operations of the first, second, and third planetary gear sets PG1, PG2, and PG3, and is then output through an output gear OG.

The first planetary gear set PG1 is a single pinion planetary gear set, and having a first sun gear S1, a first ring gear R1, and a first planet carrier PC1 rotatably supporting a first pinion P1 engaged with the first sun gear S1 and the first ring gear R1.

The second planetary gear set PG2 is a single pinion planetary gear set, and having a second sun gear S2, a second ring gear R2, and a second planet carrier PC2 rotatably supporting a second pinion P2 engaged with the second sun gear S2 and the second ring gear R2.

The third planetary gear set PG3 is a single pinion planetary gear set, and having a third sun gear S3, a third ring gear R3, and a third planet carrier PC3 rotatably supporting a third pinion P3 engaged with the third sun gear S3 and the third ring gear R3.

The first planetary gear set PG1 is operated independently, and the second and third planetary gear sets PG2 and PG3 are operated as a compound planetary gear set CPG.

Therefore, the first planetary gear set PG1 includes three rotation paths N1, N2, and N3.

The first rotation path N1 includes the first sun gear S1, is variably connected to a transmission housing H so as to be operated as a selective fixed element, and is operated as a selective output element.

The second rotation path N2 includes the first planet carrier PC1 and is directly connected to the first shaft IS1 so as to be operated as an input element.

The third rotation path N3 includes the first ring gear R1 and is operated as a selective output element.

In addition, since the second ring gear R2 is directly connected to the third planet carrier PC3 and the third ring gear R3 is directly connected to the second planet carrier PC2, the second and third planetary gear sets PG2 and PG3 include four rotation paths N4, N5, N6, and N7.

The fourth rotation path N4 includes the second sun gear S2 and selectively receives torque of the third rotation path N3.

The fifth rotation path N5 includes the second planet carrier PC2 and the third ring gear R3, and selectively receives torque of the first rotation path N1.

The sixth rotation path N6 includes the second ring gear R2 and the third planet carrier PC3, and is connected to the output gear OG so as to be continuously operated as an output element.

The seventh rotation path N7 includes the third sun gear S3, and is directly connected to the second shaft IS2 so as to receive torque selectively from the first shaft IS1 and the third rotation path N3.

In addition, the rotation paths N1-N7 are combined by first, second, and third transfer gears TF1, TF2, and TF3 and frictional elements including a first brake B1 and first, second, third, and fourth clutches C1, C2, C3, and C4.

The first, second, and third transfer gears TF1, TF2, and TF3 respectively have first, second, and third transfer drive gears TF1a, TF2a, and TF3a and first, second, and third transfer driven gears TF1b, TF2b, and TF3b externally meshed with each other.

The first transfer gear TF1 connects the first shaft IS1 to the second shaft IS2.

The second transfer gear TF2 connects the third rotation path N3 to the fourth rotation path N4.

The third transfer gear TF3 connects the first rotation path N1 to the fifth rotation path N5.

Therefore, rotation paths connected by the first, second, and third transfer gears TF1, TF2, and TF3 are rotated in opposite directions to each other. Gear ratios of the first, second, and third transfer drive gears TF1a, TF2a, and TF3a and the first, second, and third transfer driven gears TF1b, TF2b, and TF3b are set according to speed ratios demanded at shift-speeds.

Arrangements of the frictional elements B1, C1, C2, C3, and C4 will be described in detail.

The first brake B1 is mounted between the first rotation path N1 and the transmission housing H.

The first clutch C1 is mounted between the first shaft IS1 and the first transfer drive gear TF1a.

The second clutch C2 is mounted between the third rotation path N3 and the first transfer drive gear TF1a.

The third clutch C3 is mounted between the third rotation path N3 and the second transfer drive gear TF2a.

The fourth clutch C4 is mounted between the first rotation path N1 and the third transfer drive gear TF3a.

The frictional elements including the first, second, third, and fourth clutches C1, C2, C3, and C4 and the first brake B1 are conventional multi-plate friction elements of wet type that are operated by hydraulic pressure.

Figure 2:
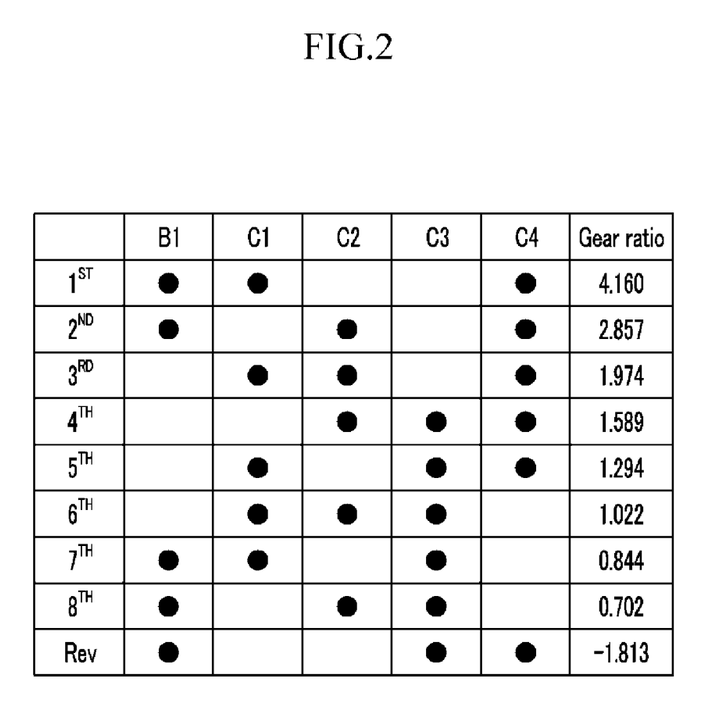
FIG. 2 is an operational chart of friction members at each shift-speed applied to a planetary gear train according to an exemplary embodiment of the present invention.

FIG. 2 is an operational chart of friction members at each shift-speed applied to a planetary gear train according to an exemplary embodiment of the present invention.

As shown in FIG. 2, three frictional elements are operated at each shift-speed in the planetary gear train an exemplary embodiment of the present invention.

The first forward speed 1ST is achieved by operating the first brake B1 and the first and fourth clutches C1 and C4.

The second forward speed 2ND is achieved by operating the first brake B1 and the second and fourth clutches C2 and C4.

The third forward speed 3RD is achieved by operating the first, second, and fourth clutches C1, C2, and C4.

The fourth forward speed 4TH is achieved by operating the second, third, and fourth clutches C2, C3, and C4.

The fifth forward speed 5TH is achieved by operating the first, third, and fourth clutches C1, C3, and C4.

The sixth forward speed 6TH is achieved by operating the first, second, and third clutches C1, C2, and C3.

The seventh forward speed 7TH is achieved by operating the first brake B1 and the first and third clutches C1 and C3.

The eighth forward speed 8TH is achieved by operating the first brake B1 and the second and third clutches C2 and C3.

The reverse speed REV is achieved by operating the first brake B1 and the third and fourth clutches C3 and C4.

FIG. 3A to FIG. 3I are lever diagrams of the planetary gear train at each shift-speed according to the first exemplary embodiment of the present invention, and illustrate shift processes of the planetary gear train according to the first exemplary embodiment of the present invention by lever analysis method.

Referring to FIG. 3A to FIG. 3I, three vertical lines of the first planetary gear set PG1 are set as the first rotation path N1, the second rotation path N2, and the third rotation path N3 from the left to the right, and four vertical lines of the compound planetary gear set CPG are set as the fourth rotation path N4, the fifth rotation path N5, the sixth rotation path N6, and the seventh rotation path N7 from the left to the right.

In addition, a middle horizontal line represents a rotation speed of "0", an upper horizontal line represents a rotation speed of "1.0", and a lower horizontal line represents a rotation speed of "−1.0".

"−" means that rotational elements is rotated in an opposite direction of a rotational direction of the engine. It is because, the first shaft IS1 and the rotation paths of the first planetary gear set PG1 are meshed externally with the second shaft IS2 and the rotation paths of the compound planetary gear set CPG through the first, second, and third transfer gears TF1, TF2, and TF3 without an idling gear.

In addition, the rotation speed of "1.0" represents the same rotational speed as the first shaft IS1 which is an input shaft. Distances between the vertical lines of the first, second, and third planetary gear sets PG1, PG2, and PG3 are set according to each gear ratio (teeth number of a sun gear/teeth number of a ring gear).

Hereinafter, referring to FIG. 2 and FIG. 3A to FIG. 3I, the shift processes of the planetary gear train according to an exemplary embodiment of the present invention will be described in detail.

[First Forward Speed]

Referring to FIG. 2, the first brake B1 and the first and fourth clutches C1 and C4 are operated at the first forward speed 1ST.

Figure 3A:
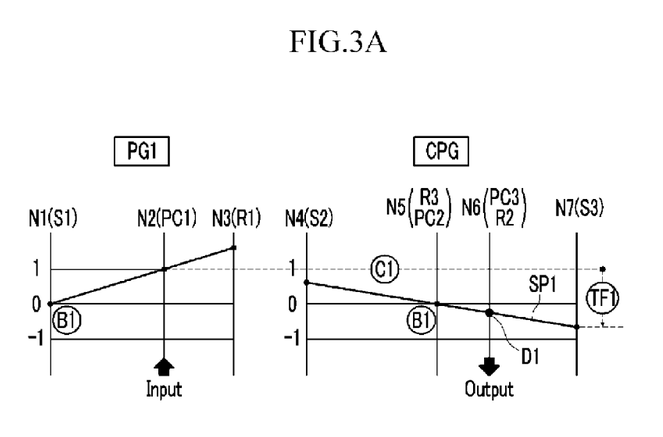
FIG. 3A is a lever diagram of a planetary gear train at the first forward speed according to an exemplary embodiment of the present invention.

As shown in FIG. 3A, the rotation speed of the first shaft IS1 is input to the second rotation path N2, and a rotation speed of the first shaft IS1 is changed according to the gear ratio of the first transfer gear TF1 by operation of the first clutch C1 and is then input to the seventh rotation path N7 as an inverse rotation speed.

At this state, the first rotation path N1 and the fifth rotation path N5 are operated as the fixed elements by operation of the first brake B1 and the fourth clutch C4. Therefore, the rotation paths of the compound planetary gear set CPG form a first shift line SP1 such that D1 is output through the sixth rotation path N6.

[Second Forward Speed]

Figure 3B:
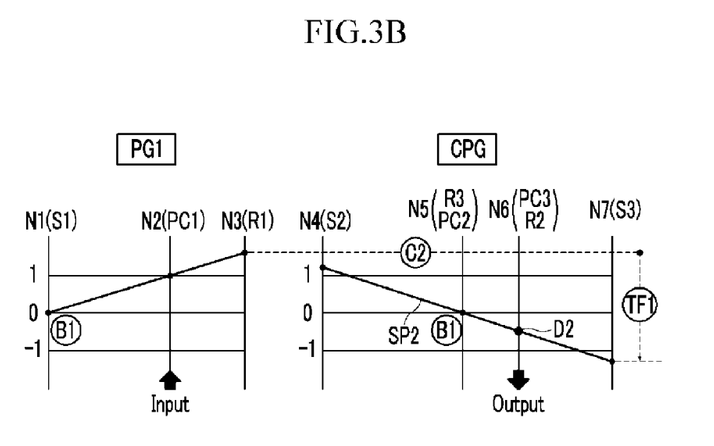
FIG. 3B is a lever diagram of a planetary gear train at the second forward speed according to an exemplary embodiment of the present invention.

The first clutch C1 that was operated at the first forward speed 1ST is released and the second clutch C2 is operated at the second forward speed 2ND.

As shown in FIG. 3B, the rotation speed of the first shaft IS1 is input to the second rotation path N2, and a rotation speed of the third rotation path N3 is changed according to the gear ratio of the first transfer gear TF1 and is then input to the seventh rotation path N7 as an inverse rotation speed by operation of the second clutch C2.

At this state, the first rotation path N1 and the fifth rotation path N5 are operated as fixed elements by operation of the first brake B1 and the fourth clutch C4. Therefore, the rotation paths of the compound planetary gear set CPG form a second shift line SP2 such that D2 is output through the sixth rotation path N6.

[Third Forward Speed]

Figure 3C:
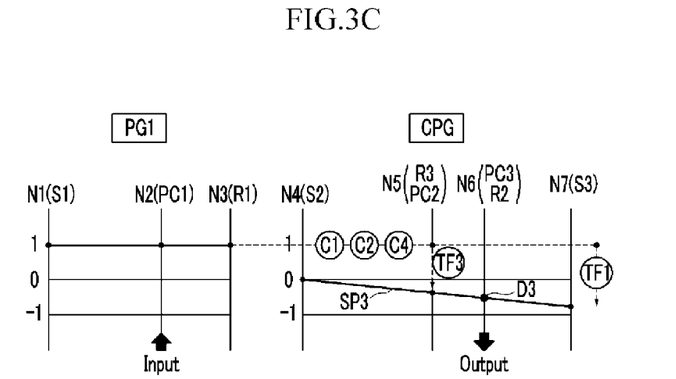
FIG. 3C is a lever diagram of a planetary gear train at the third forward speed according to an exemplary embodiment of the present invention.

The first brake B1 that was operated at the second forward speed 2ND is released and the first clutch C1 is operated at the third forward speed 3RD.

As shown in FIG. 3C, the rotation speed of the first shaft IS1 is input to the second rotation path N2 and the first planetary gear set PG1 becomes a direct-coupling state by operation of the first and second clutches C1 and C2.

Therefore, the rotation speed of the third rotation path N3 is changed according to the gear ratio of the first transfer gear TF1 and is then input to the seventh rotation path N7 as an inverse rotation speed, and the rotation speed of the first rotation path N1 is changed according to the gear ratio of the third transfer gear TF3 and is then input to the fifth rotation path N5 as an inverse rotation speed. Therefore, the rotation paths of the compound planetary gear set CPG form a third shift line SP3 such that D3 is output through the sixth rotation path N6.

[Fourth Forward Speed]

Figure 3D:
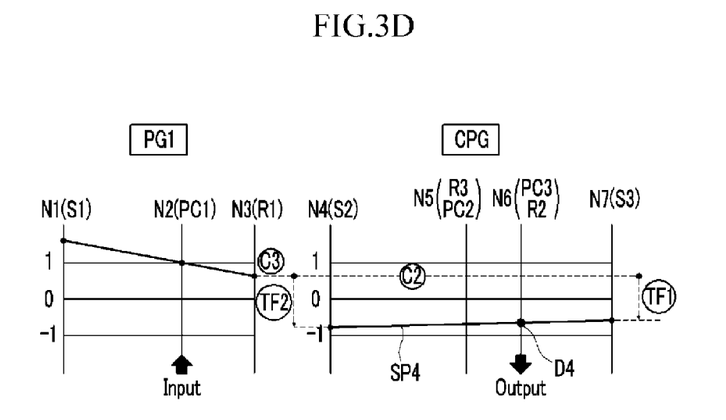
FIG. 3D is a lever diagram of a planetary gear train at the fourth forward speed according to an exemplary embodiment of the present invention.

The first clutch C1 that was operated at the third forward speed 3RD is released and the second clutch C2 is operated at the fourth forward speed 4TH.

As shown in FIG. 3D, the rotation speed of the first shaft IS1 is input to the second rotation path N2, the rotation speed of the third rotation path N3 is changed according to the gear ratio of the first transfer gear TF1 and is then input to the seventh rotation path N7 as an inverse rotation speed by operation of the second clutch C2, and the rotation speed of the third rotation path N3 is changed according to the gear ratio of the second transfer gear TF2 and is then input to the fourth rotation path N4 as an inverse rotation speed by operation of the third clutch C3.

Therefore, the rotation paths of the compound planetary gear set CPG form a fourth shift line SP4 such that D4 is output through the sixth rotation path N6.

[Fifth Forward Speed]

Figure 3E:
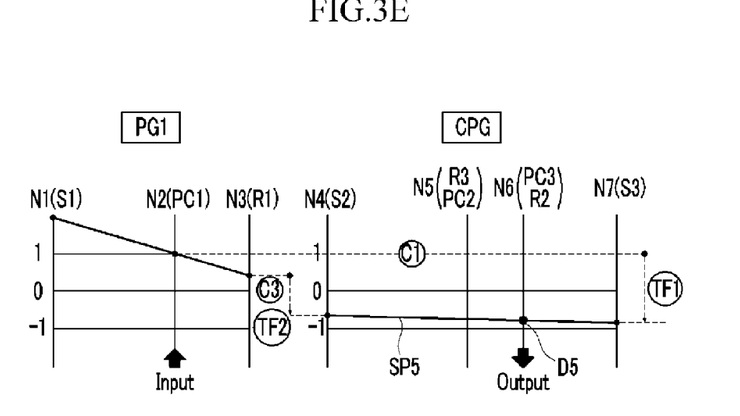
FIG. 3E is a lever diagram of a planetary gear train at the fifth forward speed according to an exemplary embodiment of the present invention.

The second clutch C2 that was operated at the fourth forward speed 4TH is released and the first clutch C1 is operated at the fifth forward speed 5TH.

As shown in FIG. 3E, the rotation speed of the first shaft IS1 is input to the second rotation path N2, the rotation speed of the first shaft IS1 is changed according to the gear ratio of the first transfer gear TF1 and is then input to the seventh rotation path N7 as an inverse rotation speed by operation of the first clutch C1, and the rotation speed of the third rotation path N3 is changed according to the gear ratio of the second transfer gear TF2 and is then input to the fourth rotation path N4 as an inverse rotation speed by operation of the third clutch C3.

Therefore, the rotation paths of the compound planetary gear set CPG form a fifth shift line SP5 such that D5 is output through the sixth rotation path N6.

[Sixth Forward Speed]

Figure 3F:
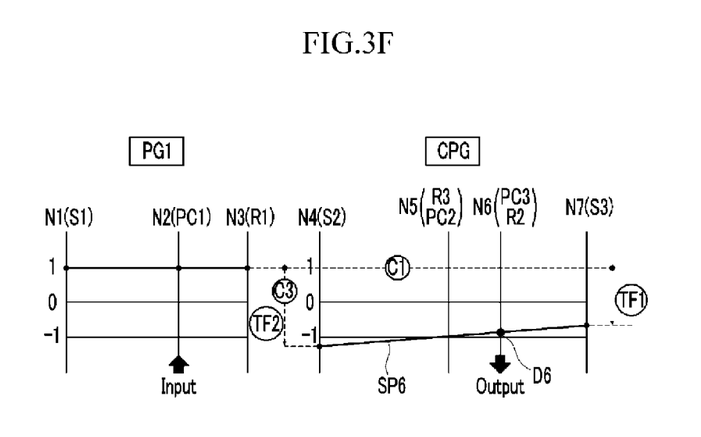
FIG. 3F is a lever diagram of a planetary gear train at the sixth forward speed according to an exemplary embodiment of the present invention.

The fourth clutch C4 that was operated at the fifth forward speed 5TH is released and the second clutch C2 is operated at the sixth forward speed 6TH.

As shown in FIG. 3F, the first planetary gear set PG1 becomes the direct-coupling state by operation of the first and second clutches C1 and C2.

At this state, the rotation speed of the first shaft IS1 is changed according to the gear ratio of the first transfer gear TF1 and is then input to the seventh rotation path N7 as an inverse rotation speed by operation of the first clutch C1, and the rotation speed of the third rotation path N3 is changed according to the gear ratio of the second transfer gear TF2 and is then input to the fourth rotation path N4 as an inverse rotation speed by operation of the third clutch C3.

Therefore, the rotation paths of the compound planetary gear set CPG form a sixth shift line SP6 such that D6 is output through the sixth rotation path N6.

[Seventh Forward Speed]

Figure 3G:
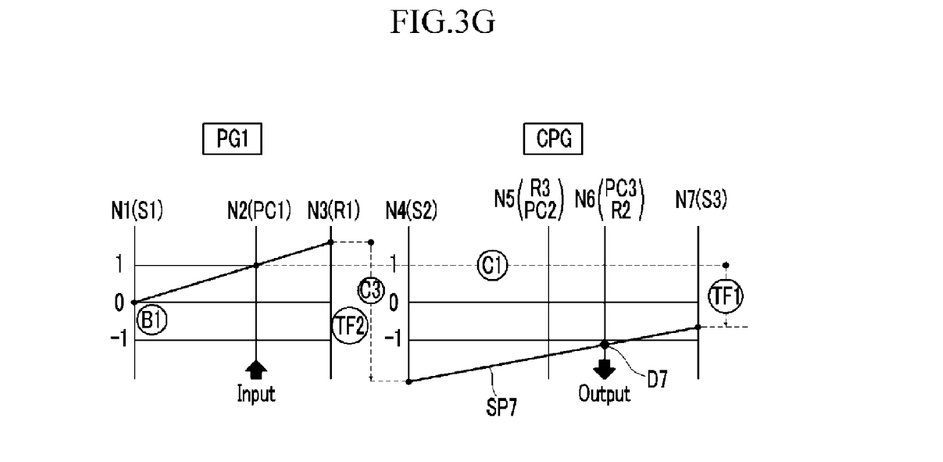
FIG. 3G is a lever diagram of a planetary gear train at the seventh forward speed according to an exemplary embodiment of the present invention.

The second clutch C2 that was operated at the sixth forward speed 6TH is released and the first brake B1 is operated at the seventh forward speed 7TH.

As shown in FIG. 3G, the rotation speed of the first shaft IS1 is input to the second rotation path N2, and the first rotation path N1 is operated as a fixed element by operation of the first brake B1.

In addition, the rotation speed of the first shaft IS1 is changed according to the gear ratio of the first transfer gear TF1 and is then input to the seventh rotation path N7 as an inverse rotation speed by operation of the first clutch C1, and the rotation speed of the third rotation path N3 is changed according to the gear ratio of the second transfer gear TF2 and is then input to the fourth rotation path N4 as an inverse rotation speed by operation of the third clutch C3.

Therefore, the rotation paths of the compound planetary gear set CPG form a seventh shift line SP7 such that D7 is output through the sixth rotation path N6.

[Eighth Forward Speed]

Figure 3H:
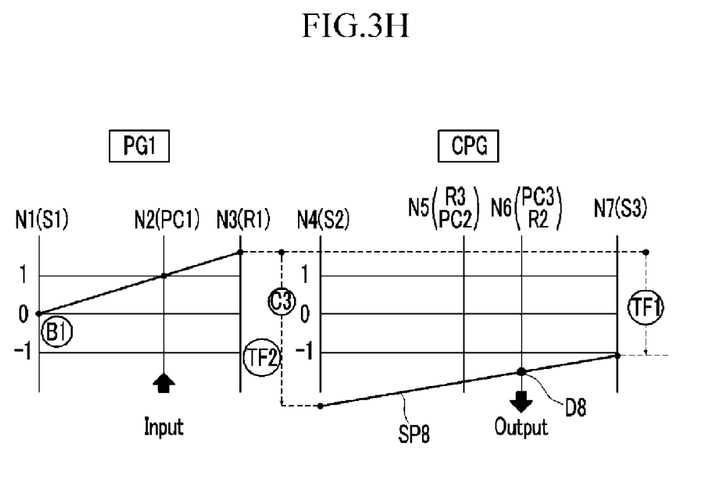
FIG. 3H is a lever diagram of a planetary gear train at the eighth forward speed according to an exemplary embodiment of the present invention.

The first clutch C1 that was operated at the seventh forward speed 7TH is released and the second clutch C2 is operated at the eighth forward speed 8TH.

As shown in FIG. 3H, the rotation speed of the first shaft IS1 is input to the second rotation path N2, and the first rotation path N1 is operated as a fixed element by operation of the first brake B1.

In addition, the rotation speed of the third rotation path N3 is changed according to the gear ratio of the first transfer gear TF1 and is then input to the seventh rotation path N7 as an inverse rotation speed by operation of the second clutch C2, and the rotation speed of the third rotation path N3 is changed according to the gear ratio of the second transfer gear TF2 and is then input to the fourth rotation path N4 as an inverse rotation speed by operation of the third clutch C3.

Therefore, the rotation paths of the compound planetary gear set CPG form an eighth shift line SP8 such that D8 is output through the sixth rotation path N6.

[Reverse Speed]

As shown in FIG. 2, the first brake B1 and the third and fourth clutches C3 and C4 are operated at the reverse speed REV.

Figure 3I:
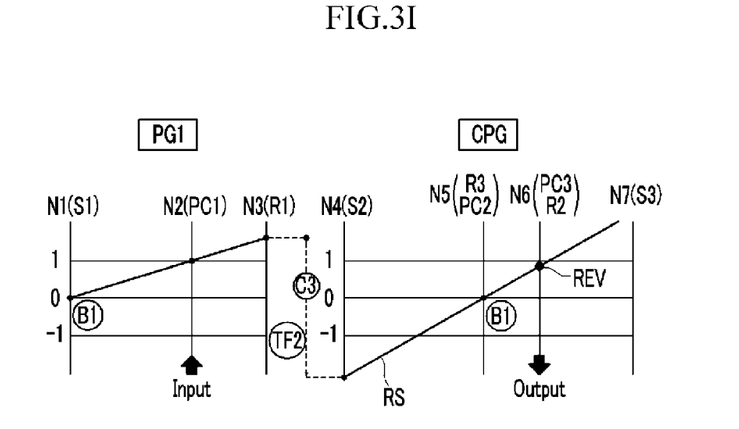
FIG. 3I is a lever diagram of a planetary gear train at a reverse speed according to an exemplary embodiment of the present invention.

As shown in FIG. 3I, the rotation speed of the first shaft IS1 is input to the second rotation path N2, the first rotation path N1 and the fifth rotation path N5 are operated as fixed elements by operation of the first brake B1 and the fourth clutch C4.

In addition, the rotation speed of the third rotation path N3 is changed according to the gear ratio of the second transfer gear TF2 and is then input to the fourth rotation path N4 as an inverse rotation speed by operation of the third clutch C3. Therefore, the rotation paths of the compound planetary gear set CPG form a reverse shift line RS such that REV is output through the sixth rotation path N6.

Since three planetary gear sets are separately disposed on the first shaft and the second shaft disposed apart from and in parallel with each other in the planetary gear train according to an exemplary embodiment of the present invention, a length thereof may be reduced and mountability may be improved.

In addition, optimum gear ratios may be set due to ease of changing gear ratios by using three external-meshing gears as well as the planetary gear sets. Since gear ratios can be changed according to target performance, starting performance may be improved. Therefore, a start-up clutch instead of a torque converter may be used.

Since three frictional elements are operated at each shift-speed, non-operated frictional element may be minimized and drag torque may be reduced. In addition, fuel consumption may be reduced by increasing power delivery efficiency.

In addition, since torque load of each frictional element can be reduced, compact design is possible.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings. as well as various alternatives and modifications thereof. It is intended that the scope of the invention be defined by the Claims appended hereto and their equivalents.

What is claimed is:

1. A planetary gear train of an automatic transmission for a vehicle, comprising:
   a first shaft receiving torque of an engine;
   a second shaft disposed in parallel with the first shaft and selectively receiving a rotation speed of the first shaft as an inverse rotation speed;
   a first planetary gear set disposed on the first shaft and including a first rotation path selectively operated as a fixed element or an output element, a second rotation path directly connected to the first shaft and operated as an input element, and a third rotation path selectively operated as an output element;
   a compound planetary gear set formed by combining a second planetary gear set and a third planetary gear set, and including a fourth rotation path selectively connected to the third rotation path, a fifth rotation path selectively connected to the first rotation path, a sixth rotation path connected to an output gear so as to be continuously operated as an output element, and a seventh rotation path directly connected to the second shaft;
   three transfer gears interposed between the rotation shafts, and to transfer an inverse rotation speed to the second shaft and the rotation paths of the compound planetary gear set; and
   five frictional elements interconnecting the rotation paths or selectively connecting the rotation paths to a transmission housing;
   wherein the first planetary gear set is a single pinion planetary gear set having a first sun gear, a first planet carrier, and a first ring gear,
   wherein the second planetary gear set is a single pinion planetary gear set having a second sun gear, a second planet carrier, and a second ring gear, and
   wherein the third planetary gear set is a single pinion planetary gear set having a third sun gear, a third planet carrier, and a third ring gear,
   wherein the first rotation path includes the first sun gear,
   wherein the second rotation path includes the first planet carrier,
   wherein the third rotation path includes the first ring gear,
   wherein the fourth rotation path includes the second sun gear,
   wherein the fifth rotation path includes the second planet carrier and the third ring gear,
   wherein the sixth rotation path includes the second ring gear and the third planet carrier, and
   wherein the seventh rotation path includes the third sun gear.

2. A planetary gear train of an automatic transmission for a vehicle, comprising:
   a first shaft receiving torque of an engine;
   a second shaft disposed in parallel with the first shaft and selectively receiving a rotation speed of the first shaft as an inverse rotation speed;
   a first planetary gear set disposed on the first shaft and including a first rotation path selectively operated as a fixed element or an output element, a second rotation path directly connected to the first shaft and operated as an input element, and a third rotation path selectively operated as an output element;
   a compound planetary gear set formed by combining a second planetary gear set and a third planetary gear set, and including a fourth rotation path selectively connected to the third rotation path, a fifth rotation path selectively connected to the first rotation path, a sixth rotation path connected to an output year so as to be continuously operated as an output element, and a seventh rotation path directly connected to the second shaft;
   three transfer gears interposed between the rotation shafts, and to transfer an inverse rotation speed to the second shaft and the rotation paths of the compound planetary gear set; and
   five frictional elements interconnecting the rotation paths or selectively connecting the rotation paths to a transmission housing;
   wherein the three transfer gears include:
      a first transfer gear including a first transfer drive gear selectively connected to the first shaft and a first transfer driven gear connected to the second shaft;
      a second transfer gear including a second transfer drive gear selectively connected to the third rotation path and a second transfer driven gear connected to the fourth rotation path; and
      a third transfer gear including a third transfer drive gear selectively connected to the first rotation path and a third transfer driven gear connected to the fifth rotation path.

3. The planetary gear train of claim 2, wherein the five frictional elements include:
- a first clutch mounted between the first shaft and the first transfer drive gear;
- a second clutch mounted between the third rotation path and the first transfer drive gear;
- a third clutch mounted between the third rotation path and the second transfer drive gear;
- a fourth clutch mounted between the first rotation path and the third transfer drive gear; and
- a first brake mounted between the first rotation path and the transmission housing.

4. The planetary gear train of claim 2, wherein a first forward speed is achieved by operating the first brake and the first and fourth clutches,
- a second forward speed is achieved by operating the first brake and the second and fourth clutches,
- a third forward speed is achieved by operating the first, second, and fourth clutches,
- a fourth forward speed is achieved by operating the second, third, and fourth clutches,
- a fifth forward speed is achieved by operating the first, third, and fourth clutches,
- a sixth forward speed is achieved by operating the first, second, and third clutches,
- a seventh forward speed is achieved by operating the first brake and the first and third clutches,
- an eighth forward speed is achieved by operating the first brake and the second and third clutches, and
- a reverse speed is achieved by operating the first brake and the third and fourth clutches.

* * * * *